US005438171A

United States Patent [19]

Schmanski

[11] Patent Number: 5,438,171
[45] Date of Patent: Aug. 1, 1995

[54] COMPOSITE SOUND WALL

[75] Inventor: Donald W. Schmanski, Carson City, Nev.

[73] Assignee: Carsonite International Corporation, Carson City, Nev.

[21] Appl. No.: 171,899

[22] Filed: Feb. 9, 1994

Related U.S. Application Data

[63] Continuation-in-part of Ser. No. 824,108, Dec. 21, 1993, Pat. No. 5,272,284.

[51] Int. Cl.6 ............................................. E04H 17/00
[52] U.S. Cl. ................................. 181/210; 181/286; 52/144; 52/145
[58] Field of Search ............. 181/210, 284, 286, 287, 181/288, 290, 294, 295, 291; 52/144, 145; 405/286

[56] References Cited

U.S. PATENT DOCUMENTS

| 884,354 | 4/1908 | Bertrand | 405/286 |
| 2,423,199 | 7/1947 | Milnor | 181/290 |
| 3,656,576 | 4/1972 | Gubela | 181/290 |
| 3,948,009 | 4/1976 | Bernhard | 52/144 |
| 4,114,725 | 9/1978 | Croasdale | 181/210 X |
| 4,143,495 | 3/1979 | Hintz | 181/290 |
| 4,840,826 | 6/1989 | Shirasaki et al. | |
| 4,899,498 | 2/1990 | Grieb | 52/144 |
| 4,939,037 | 7/1990 | Zion et al. | |
| 5,217,771 | 6/1993 | Schmanski et al. | 181/290 X |
| 5,272,284 | 12/1993 | Schmanski | 181/210 |

Primary Examiner—Khanh Dang
Attorney, Agent, or Firm—Thorpe, North & Western

[57] ABSTRACT

A sound absorbing device for use as a sound barrier. The device includes at least one elongated tubular member of fiber reinforced, thermosetting resin formed by pultrusion and having a hollow interior able to receive sound absorbing material. The hollow interior is filled with sound absorbing material including particulate, recycled polymer firmly compacted within and substantially filling the hollow interior of the tubular member.

5 Claims, 2 Drawing Sheets

COMPOSITE SOUND WALL

This is a continuation-in-part of Ser. No. 07/824,108, filed Dec. 21, 1993, now U.S. Pat. No. 5,272,284.

BACKGROUND OF THE INVENTION

1. The Field of Invention

This invention relates to a barrier designed to absorb sound produced by highway traffic. Specifically, the invention pertains to extended lengths of pultruded tubing of fiber reinforced plastic which is filled within the tube hollow with shredded, recycled thermoplastic polymers for sound absorption. An array of such tubes may be bonded to form an integral sound wall.

2. Prior Art

The expansion of major highways and other forms of ground transportation within residential areas naturally leads to intrusion of unwanted sound, which may even be detrimental to health. Government involvement in environmental control of this problem has lead to required use of sound barriers to reduce sound transmission. An ongoing challenge in this endeavor has been to develop a product that is cost effective with natural materials such as wood and concrete, but which is more easily stored, transported and installed.

U.S. Pat. No. 4,143,495 discloses the use of a sound wall constructed of elongate, sheet metal panels which contain shredded polymer material, such as recycled tires. These panels form modular segments similar to concrete panels which can be lowered into opposing slotted columns in vertical alignment to form a wall section. A similar metal panel is shown in U.S. Pat. No. 2,423,199, using a fibrous material as an internal sound absorbing medium.

Several attempts have been made by the present inventor to apply plastics technology to this need, particularly in view of the known durability of many plastic materials, their light weight and ease of storage and installation. See, for example, U.S. Pat. No. 5,217,771. This resource has been complemented with use of recycled plastics as sound absorbing filler, based on the ready availability of large volumes of refuse materials made of plastics such as polyolifins. These materials may be combined with more dense polymers such as spent tires (another refuse disposal problem of major proportion) to develop a modular sound wall structure made of extruded or pultruded plastic materials. See, for example, U.S. Pat. No. 5,272,284 by the present inventor.

None of these efforts has yielded a commercially acceptable product that maximizes the cost benefits of recycled plastics, with the use of fiber-reinforced plastic (FRP) as a load bearing, structural member.

OBJECTS AND SUMMARY OF THE INVENTION

It is therefore an object of the present invention to provide a FRP sound barrier element useful as part of a sound barrier wall which has desired strength in both vertical and horizontal orientation to facilitate shipping, storage and emplacement without modification or damage to the structure or sound absorbing materials contained within the barrier element.

It is a further object of this invention to provide a sound barrier element which is ready for use as part of a sound barrier wall without need for modification except for structural assembly.

It is an additional object of this invention to provide a sound barrier element which retains its original shape and dimension, despite extended storage in stacked array.

It is yet another object to provide sound wall member that is structurally integrated by the pultrusion of an extruded core of thermoplastic, sound absorbing material in combination with surrounding fiber reinforced, thermosetting resin to form a single pultruded structure.

It is a further object of this invention to develop a sound wall panel which comprises a single unit capable of being lowered into opposing slots of upright posts as part of final installation of an extended length of a sound wall structure.

These and other objects are realized in a sound absorbing device for use as part of a sound barrier, wherein the device includes an elongated tubular member of fiber reinforced, thermosetting resin formed by a pultrusion process and having a hollow interior able to receive sound absorbing material; and a cross-sectional sound absorbing material including particulate, recycled polymer firmly compacted within and substantially filling the hollow interior of the tube member. The device may further comprise at least 2 support posts configured for vertical orientation, each support post including at least one slotted channel configured to received an end of the tubular member. The support post is positioned with the slotted channels in opposing orientation and separated by a distance equal to a length of the tubular member, with the support posts having a plurality of tubular members journaled in a stacked array within the slotted channels at opposing ends to form a sound barrier.

An additional preferred embodiment includes a combination of (i) extruded thermoplastic core having reinforcement of particulate, recycled tire material and (ii) a tubular body with fiber reinforced thermosetting resin, the combination being formed as an integral body by pultrusion through a single die. Formation of such a device is enabled by a method for preparing a sound wall member of fiber reinforced resin and foamed polymer core comprising the steps of:

a) blending thermoplastic materials, recycled tire material and blowing agent within a container;

b) feeding the blended materials into an extrusion device to produce an extrudate of foamed thermoplastic material with particulate tire material as binder;

c) applying a surrounding sheath of fibers and thermosetting resin to the extrudate of the previous step;

d) feeding the combined extrudate and surrounding sheath into a pultrusion die to yield a pultruded member of fiber reinforced resin around a core material of thermoplastic extrudate.

These and other objects will be better understood from the following detailed description, taken in combination with the accompanying drawings.

DETAILED DESCRIPTION OF THE INVENTION

Figure 1:
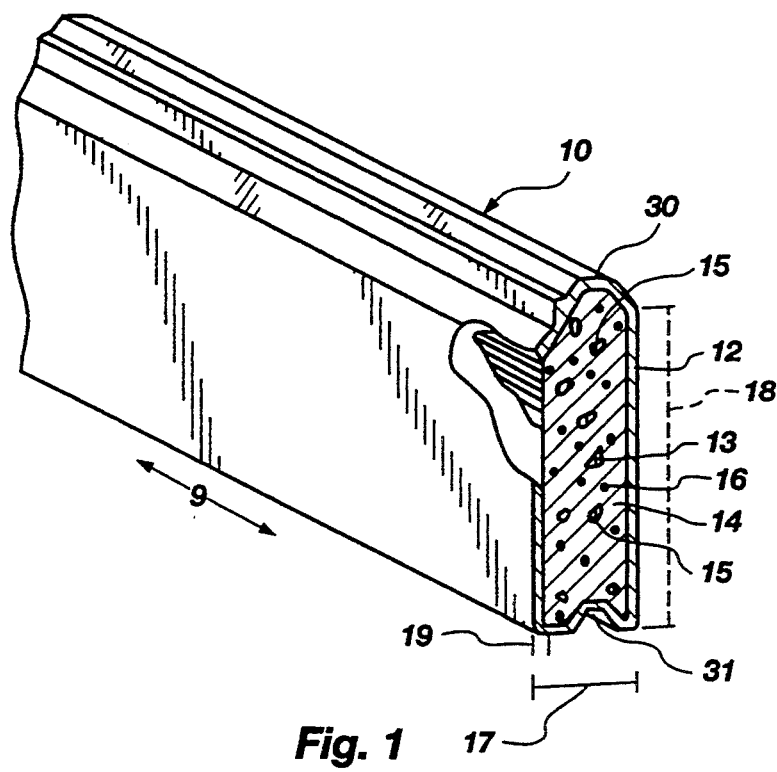
FIG. 1 shows a perspective view of a sound absorbing device constructed in accordance with the present invention.

A sound absorbing device 10 for use as part of a sound barrier 11 provides a modular assembly that not only gives improved sound absorption, but embodies strength and durability associated with permanent structures such as lumber or concrete. The individual sound absorbing devices 10 comprise elongated tubular members 12 of fiber reinforced, thermosetting resin having a hollow interior able to receive sound absorbing material 13. The sound absorbing material 13 includes particulate, recycled polymer firmly compacted within and substantially filling the hollow interior of the tube member.

The tubular member 12 is preferably formed by a well known process of pultrusion which cures a composite of thermosetting resins and reinforcing fiber within a die having an opening configured to the desired shape of the part being pultruded. This process yields a product which is rigid, durable and compatible with the environment. It can be colored with dyes within the resin which can conform to any setting for a sound wall. Numerous resin formulations and reinforcing fiber materials are available within
the industry, and can be specifically formulated by suppliers to meet particular specifications.

The figures illustrate the use of a semi-rectangular configuration for the tubular member, which offers preferred properties of stacking and maximum absorption of sound waves. The illustrated tubular member has a cross-sectional 17 width dimension within the range of 2 inches to 8 inches and a height dimension 18 of at least 3 inches. The tubular member has a wall thickness within the range of 0.075 to 0.200 inches and a preferred wall thickness of approximately 0.125 inches. The height of the tubular member is preferably within the range of 5 to 10 inches, with the favored dimension being 6.375 inches. The length of the tubular member may extend to any desired distance, with a preferred range of 6 to 12 feet. Even at these longer lengths, the pultruded thermosetting, fiber reinforced resins offer excellent cantilevered support and durability.

The tubular member is filled with soft, sound-absorbing polymers such as recycled polymers selected from the group consisting of recycled rubber and recycled thermoplastic polymers. These polymers are typically shredded or otherwise reduced to a mesh size within the range of 12 to 2, and preferably 8 to 4. The sound absorbing material may be compressed within the tube in a dry condition, or may be adhesively adhered to adjacent particles. It is preferred that this compacted sound absorbing material have an average density within the range of 5 to 10 lbs/sq foot.

Figure 4:
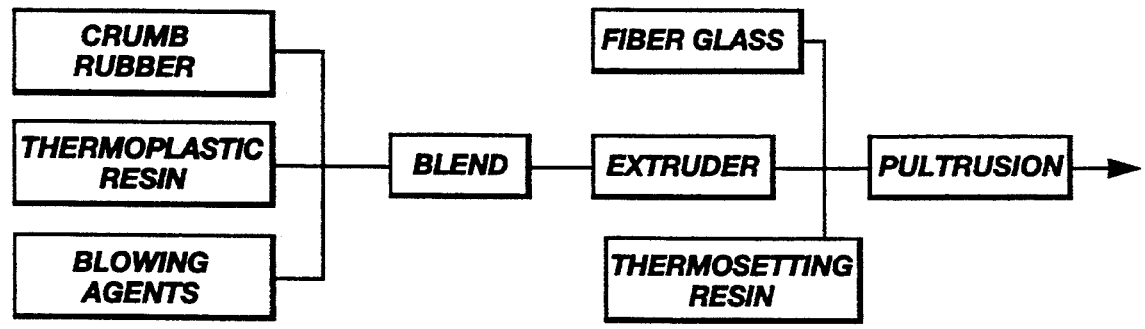
FIG. 4 shows a block diagram of a coextrusion/pultrusion process for preparing such a sound wall.
Figure 5:
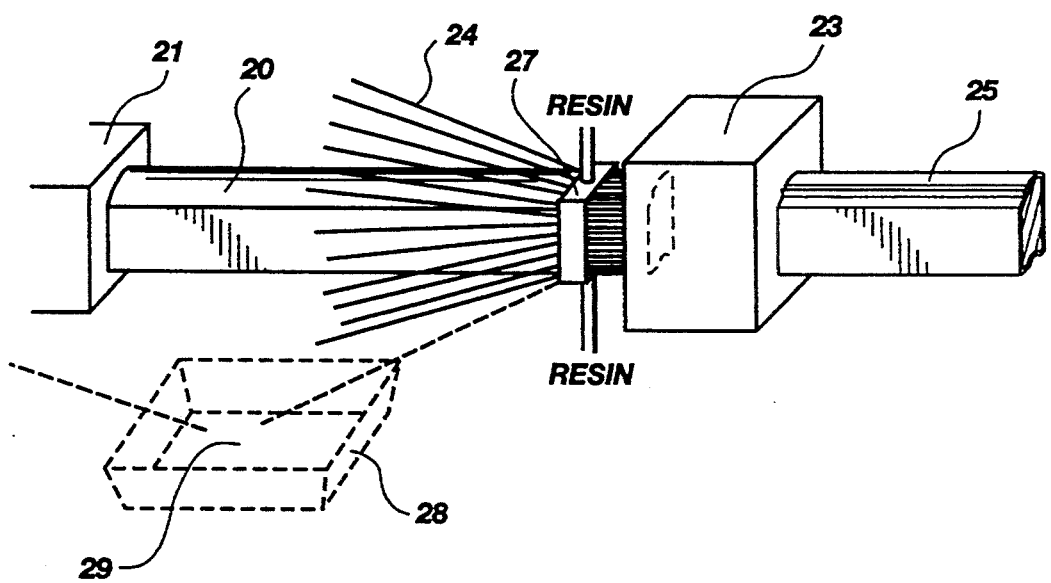
FIG. 5 illustrates mechanisms for applying fiber at the extrudate prior to curing in the pultrusion die.

A sound absorbing device of unibody construction can be fabricated by a preferred process which combines the bonding of the sound absorbing polymers in an extruded form, followed by pultrusion of the sound absorbing polymers within the tubular member as a single operation. Specifically, a foamed rubber, reinforced thermoplastic core 20 is extruded as shown in FIGS. 4 and 5, wherein the ground rubber and thermoplastic materials are blended with blowing agents and processed through an extruder 21 to produce a rubber reinforced 15, thermoplastic foam 16 composition of the desired cross-section. This extruded part can then be fed directly into a pultrusion die 23 in combination with reinforcing fibers 24 which are positioned to surround the extrudate core 20. An integrated, rigid, sound absorbing member 25 is thereby produced which can be cut at any length desirable.

This procedure is more specifically described as follows. Powdered thermoplastics such as recycled olifins are blended with a blowing agent and chips of recycled tires. In order to enable the blend to process through an extruder, a blowing agent is added. This creates a foamed composition including air pockets 16. The foamed structure allows the extrudate to cool and solidify, whereas without the blowing agent, the product retains its heat and is slow to cure. The rubber crumbs or chips act as reinforcement.

As the extrudate 20 progresses toward the pultrusion device 23, a surrounding sheath of reinforcing fibers 24 is applied. This may be accomplished by numerous techniques, including the following three examples. Specifically, spools of fiber can provide continuous feed to a positioning ring 27, which guides the fiber into proper alignment around the extrudate 20. Such fiber may be selected from glass, graphite or numerous other compositions, depending upon the desired properties and economies. If the selected fiber includes previously applied thermosetting resin, no additional resin may be required. If the fiber is untreated or inadequate resin has been applied, a resin bath 28 can supply additional liquid resin 29 as binder. A third option is to introduce the liquid thermosetting resin at the positioning ring 27 in accordance with conventional practice.

By applying a surrounding sheath of fibers and thermosetting resin to the extrudate, it is possible to form a rigid thermosetting wall around the thermoplastic core, and form the structure in one continuous process. This process offers numerous advantages over prior art techniques of inserting loose fill material with the tubular member. For example, this coextrusion/pultrusion process avoids later compaction of the filler, with its resultant loss of sound absorption. It eliminates the labor intensive step of filling and compacting the tubular member by hand or machine. It increases the strength of the soundwall member, because of its integral formation of the thermoplastic core bonded within the outer thermosetting, fiber reinforced wall.

Because the thermoplastic and blended rubber acts as a heat sink in the extrusion process, the extrudate can be fed directly into the pultrusion die, allowing the retained heat to assist in the curing process for the thermosetting resin. In this manner, the two processes complement each other, and add to the economies of the overall process.

This process offers several additional advantages of the prior art. First, the use of the preformed core of extruded foamed polymers eliminates the need for a costly core die for the pultrusion process. This would otherwise be required to produce the hollow cross-section of the pultruded tubular member. As a consequence, the three step process of (i) forming the thermosetting tubular member, (ii) preparing the particulate thermoplastic filler, and (iii) mechanically filling the tubular member has been reduced to a single process.

Figure 2:
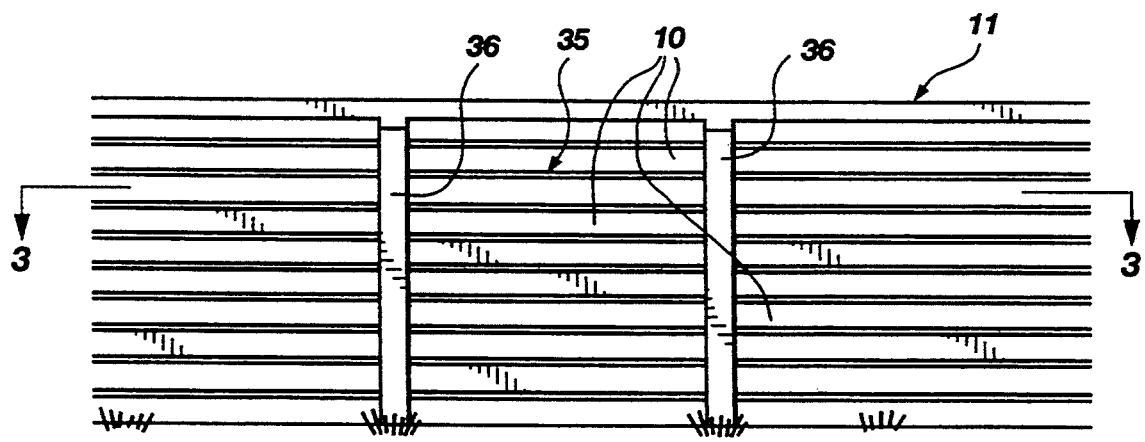
FIG. 2 illustrates sound wall constructed of the absorbing devices shown in FIG. 1, positioned in slotted columns.
Figure 3:
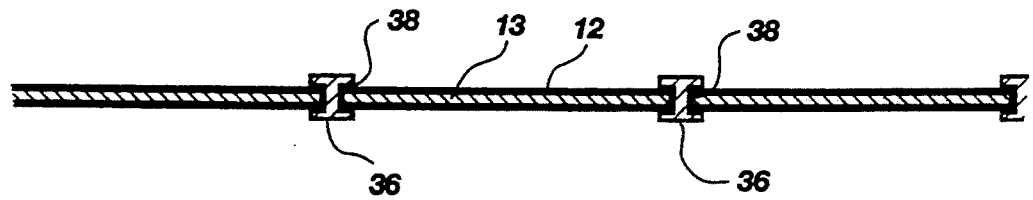
FIG. 3 depicts a top view of the sound wall shown in FIG. 2.

Furthermore, the individual sound wall members may be stacked vertically as shown in FIGS. 2 and 3, with tongue-inn-groove sections 30 and 31 being bonded to form an integral wall structure. Such bonding enables construction personnel to lower single sections 35 into slotted engagement 38 with upright posts 36 in a manner currently practiced with concrete sound wall structures. With the present invention, however, the difference in weight is substantial, further reducing cost and risk of injury. A decorative cap 37 can be applied to give the sound wall a finished appearance which complements the environment and surroundings.

Whether the separate fill or the coextrusion/pultrusion process is applied, the pultruded tubing is advantageous over prior art thermoplastic structures due to the rigid character of thermosetting resin, in that it maintains its shape and diameter under stress. As shipping and assembly take place, the tubing shape will remain constant so it will correctly fit into the vertical columns. The product is therefore more wear resistant and less subject to inadvertent damage.

In addition, the constancy of the diameter of the pultruded product will preserve small tolerances within the slot of the fitting of the vertical columns so that the tubing won't have free play. This will preserve the integrity of the ends of the tubes. Where the loose fill technique is applied, the structural rigidity of the pultruded tubular member will distribute the weight of the thermoplastic contents uniformly even though the contents are not evenly distributed.

Other benefits and features will become apparent to those skilled in the art, based on the preceding description. It will be understood that this description is intended to be illustrative, and should not be construed as limiting, except as defined in the following claims.

I claim:

1. A sound absorbing device for use as a sound barrier, said device comprising:
   at least one elongated tubular member of fiber reinforced, thermosetting resin having a hollow interior of uniform cross-section able to receive sound absorbing material wherein the tubular member is formed by pultrusion and wherein the tubular member has a cross-section which is substantially rectangular having a width dimension within the range of 2 inches to 8 inches; and
   a sound absorbing material including particulate, recycled polymer firmly compacted within and substantially filling the hollow interior of the tubular member.

2. A device as defined in claim 1, wherein the tubular member has a height dimension of at least 3 inches.

3. A sound absorbing device for use as a sound barrier, said device comprising:
   at least one elongated tubular member of fiber reinforced, thermosetting resin having a hollow interior of uniform cross-section able to receive sound absorbing material wherein the tubular member is formed by pultrusion and wherein the tubular member has a cross-section which is substantially rectangular having a preferred wall thickness of 0.125 inches; and
   a sound absorbing material including particulate, recycled polymer firmly compacted within and substantially filling the hollow interior of the tubular member.

4. A sound absorbing device for use as a sound barrier, said device comprising:
   at least one elongated tubular member of fiber reinforced, thermosetting resin having a hollow interior of uniform cross-section able to receive sound absorbing material wherein the tubular member is formed by pultrusion and wherein the tubular member has a length within the range of 6 feet to 12 feet; and
   a sound absorbing material including particulate, recycled polymer firmly compacted within and substantially filling the hollow interior of the tubular member.

5. A sound absorbing device for use as a sound barrier, said device comprising:
   at least one elongated tubular member of fiber reinforced, thermosetting resin having a hollow interior of uniform cross-section able to receive sound absorbing material wherein the tubular member is formed by pultrusion wherein the compacted sound absorbing material has an average density within the range of 5 to 10 lbs/sq foot; and
   a sound absorbing material including particulate, recycled polymer firmly compacted within and substantially filling the hollow interior of the tubular member.

* * * * *